Figure 1:
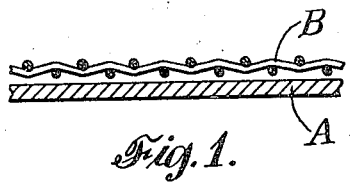

April 15, 1947.   E. W. RUGELEY ET AL   2,418,904
PRODUCTION OF REINFORCED COMPOSITE STRUCTURES
Filed June 23, 1943

INVENTORS
EDWARD W. RUGELEY
THEOPHILUS A. FEILD, JR.
BY
ATTORNEY

Patented Apr. 15, 1947

2,418,904

UNITED STATES PATENT OFFICE 2,418,904

PRODUCTION OF REINFORCED COMPOSITE STRUCTURES

Edward W. Rugeley and Theophilus A. Feild, Jr., Charleston, W. Va., assignors to Carbide and Carbon Chemicals Corporation, a corporation of New York Application June 23, 1943, Serial No. 491,918

8 Claims. (Cl. 154—139)

This invention relates to composite structures; and more especially it concerns the production of laminated and other reinforced structures made from at least two thermoplastic vinyl resin compositions comprising a plasticizer or softening agent for one of such vinyl resins, which plasticizer is incompatible or partially so with another of the vinyl resin compositions present in the structure under the conditions employed for the production of such structure.

The invention has especial utility in connection with the manufacture of strong composite structures made from filaments, yarns, threads, sheets, films, webs, or woven, knitted, braided or other fabrics, comprising a water-insoluble vinyl resin, which structures have been reinforced, their tensile strength increased, and their resistance to tearing and puncturing forces, and undue stretching reduced by association therewith of textile materials, such as threads, yarns, webs, batts and woven, knitted, braided and other fabrics made from certain vinyl resins produced by the conjoint polymerization of a vinyl halide and acrylonitrile.

Among vinyl resins adapted to be reinforced, with the production of the composite structures of this invention, are the resins produced by the conjoint polymerization of a vinyl halide with a vinyl ester of an aliphatic acid, and particularly those copolymer resins having between 70% and 95% of the halide in the polymer and having macromolecular weights of at least 7500; polyvinyl chloride resins; after-chlorinated polyvinyl resins of the foregoing types; polyvinylidene chloride resins; polyvinyl acetate resins; polyvinyl acetal type resins; polystyrene resins; and resinous polymers of acrylic, methacrylic and other alkylated acrylic compounds.

A wide variety of sheeted and other products made from or containing vinyl resins are now in common use for many purposes, including the manufacture of wrapping and packaging materials; laminated safety glass; furniture covering; shower curtains; wearing apparel such as shoes, shoe uppers and toes, belts, suspenders, raincoats and hats; containers for water and various chemical compositions; medical irrigation bags; pontoons, balloon envelopes, sponge rubber substitutes, etc. In order to impart to such vinyl resin products the necessary flexibility and elasticity required to adapt them for the required services, and to facilitate their production, it is customary to incorporate in the resins substantial amounts of plasticizers.

While such plasticized compositions are well adapted for many uses, the presence of the plasticizer, which may often constitute up to 50% of the composition, materially lowers both the tensile strength and the softening point of such compositions. Consequently, when thin films, sheets or fabrics of the vinyl resin, or of the plasticized resin composition, are employed for certain purposes, as in the production of wrapping and packaging materials, they may lack adequate strength, and may have insufficient resistance to impacts and to tearing and puncturing forces. Furthermore, such articles, particularly when in the form of thin films or sheets, often tend to stretch or become unduly distorted and to take a permanent set when exposed to heat and/or to stretching forces normally encountered during use of the article. This is particularly objectionable in instances where the materials must more or less closely fit a form, as in the production of shoe stiffeners and shoe tips.

Among the more important objects of this invention are: the production of novel composite or laminated structures having high tensile strengths, flexibility, toughness, resilience and resistance to impact and to tearing and puncturing forces, and which are especially resistant to deformation; and the production of a novel composite structure formed from at least two vinyl resins and having excellent resistance to chemical attack by dilute acids and alkalies, and to the action of ultra-violet light, and which are water-resistant, do not support combustion, and inhibit bacterial and fungus growths.

The invention is based in important part upon the discovery that strong, tough, composite sheeted articles and fabrics having wide commercial utility may be produced by intimately uniting, with the aid of pressure, filaments, fibers, batts, webs, and woven, knitted, braided or felted fabrics containing filaments, fibers, or threads of a vinyl resin such as produced by the conjoint polymerization of a vinyl halide with acrylonitrile, with a preformed sheet, film, fabric or other structure containing a water-insoluble vinyl resin such as those produced by the conjoint polymerization of a vinyl halide with a vinyl ester of an aliphatic acid, which last-named vinyl resin has present therein a plasticizer for the latter which is incompatible with or incapable of substantially plasticizing the vinyl halide-acrylonitrile copolymer resin in the filamentary, fibrous or other shape under the temperature and pressure conditions employed in permanently uniting the two resin structures.

Instead of using preformed sheets or fabrics of such vinyl resins, strong stretch-resistant composite structures may be formed by intermingling unspun heterogeneously-arranged textile fibers or filaments of each of these two types of resins, forming a web or a batt therefrom, then contacting with these mixed elements a plasticizer for the vinyl halide-vinyl ester of aliphatic acid copolymer type of resin but which is substantially incompatible with the vinyl halide-acrylonitrile copolymer type of vinyl resin under the conditions employed in making the composite articles of the invention. The mixed elements are then intimately bonded to form a permanent composite structure through the action of pressure and of heat in amount sufficient to soften and deform the elements of that vinyl resin which is compatible with the plasticizer present, and cause the elements to soften and/or to fuse, and the resin thereof intimately to bond to the elements of the vinyl halide-acrylonitrile type of vinyl resin, which is substantially unaffected by the heat and pressure employed, and by the plasticizer present.

In accordance with one preferred modification of the invention for the production of reinforced laminated vinyl resin sheet stock, a felted, woven, knitted, or otherwise formed reinforcing element or fabric made from or containing filaments, fibers, threads or the like of a vinyl resin formed by the conjoint polymerization of a vinyl halide and acrylonitrile is contacted with a coextensive flexible sheet—or is inserted between two such sheets—of a plasticized vinyl resin such as those formed by the conjoint polymerization of a vinyl halide and a vinyl ester of an aliphatic acid and containing between around 70% and around 95% of the halide in the polymer. The plasticizer present in the last-named resin is substantially incompatible with, or substantially without plasticizing effect upon, the vinyl resin fibers or the like forming the said reinforcing fabric under the pressure and temperature conditions employed in the production of the composite article; and the latter resin has a higher softening temperature than the vinyl resin from which the sheet stock is made. The vinyl resin fabric and the plasticized sheet stock are then intimately bonded into a permanent unitary reinforced structure by the application of pressure while being heated to a temperature at which the resin of the sheet stock is flowable and adhesive, but below the softening point of the resin, filaments or fibers of which the reinforcing element is made.

In order to facilitate the penetration of the vinyl resin of said sheet stock within and around the interstices of the reinforcing fabric, and the intimate union of the fabric and sheets, such fabric may be wetted, prior to the application of heat and pressure, with a plasticizer for the vinyl resin of the sheet stock.

Temperatures ranging from 100° to 175° C. and even higher, are useful in the heat-bonding and laminating operation. The vinyl resin sheets and films used in making the composite article may range upwardly from 0.003 inch in thickness, and commonly range between 0.005 inch and 0.085 inch in thickness. Such sheets and films usually are transparent or translucent, in the absence of fillers, pigments, and the like, employed to provide opacity, color, etc.

Preferably the various vinyl resins used in the practice of the invention have incorporated therein small amounts, e g., about 0.25% of the weight of the resin, of a compound stabilizing the resin against decomposition by heat and/or light. Suitable compounds are organo-metallic compounds, such as the tin and lead salts of carboxylic acids, e. g., dibutyl tin dilaurate. These stabilizers are disclosed in U. S. Patents Nos. 2,267,778 and 2,307,092 of V. Yngve. They may be added to the resin in the usual manner or, if desired, the composite assembly may be sprayed, dipped or otherwise may be treated with a solution of such a stabilizer prior to the bonding and laminating operation.

The use, as reinforcing media in the composite structures of the invention, of filaments, fibers, yarns, batts, webs, and fabrics of the vinyl chloride-acrylonitrile copolymer resins offers particularly important advantages because of special properties which such vinyl resins possess. Among these are:

a. The resistance by structural elements made from these resins to softening, loss of strength, shape, and elasticity, in the presence of plasticizers commonly employed to plasticize water-insoluble vinyl resins, for example, polyvinyl chloride resins, and those formed by the conjoint polymerization of vinyl chloride and vinyl acetate;

b. The resistance of structural elements made from these resins to the deteriorating action of products which may be formed by the slow decomposition of various water-insoluble vinyl resins;

c. The high softening points of elements made from these resins in comparison with articles made from either plasticized or unplasticized vinyl chloride-vinyl acetate copolymer vinyl resins;

d. The resistance of yarns and filaments of such resins to wetting, swelling, and deterioration, to which rayon, cotton, and the like are subject when used as vinyl resin sheet stock reinforcing elements; and e. The facility with which elements made from such resins may be intimately bonded with vinyl chloride-vinyl acetate copolymer resins at temperatures well below the softening point of the former, and below temperatures at which such elements lose their shape and their distinctive physical and chemical properties.

Vinyl resins suitable for use in making sheeting which may be reinforced by the practice of this invention are described in U. S. Patents No. 1,935,577 and No. 2,064,565 of E. W. Reid. Where fibers of such vinyl resins are employed in the production of the sheet, web, fabric or other structure to be reinforced, the fibers conveniently may be produced in the manner described in U. S. Patent No. 2,161,766 or E. W. Rugeley, T. A. Feild, Jr., and J. F. Conlon.

The vinyl halide-acrylonitrile copolymer resins employed for the production of filaments, fibers, yarns and fabrics preferably used as reinforcing media in the practice of this invention, and such filaments, fibers, yarns and fabrics, are conveniently produced in the manner described in the pending application Serial No. 476,616 of E. W. Rugeley, T. A. Feild, Jr., and J. F. Petrokubi, from vinyl resins produced by the conjoint polymerization of a vinyl halide and acrylonitrile. As recited in that application, such resins are dispersible in acetone, contain between about 45% and about 80% of the halide in the polymer, and possess specific viscosities at 20° C. of above 0.10, and preferably between around 0.2 and around 0.6. These specific viscosities are determined, using an Ostwald viscosimeter, in accordance with the formula:

$$\text{Sp. Vis.} = \frac{\text{Viscosity of a solution of 0.1 gram of the resin in 50 c.c. acetonyl acetone}}{\text{Viscosity of the acetonyl acetone}} - 1$$

Examples of suitable plasticizers useful with the invention are the various phthalate esters, such as dibutyl phthalate, di (2-ethylhexyl) phthalate, phenyl phthalate and butoxyglycol phthalate; organic phosphates such as tributyl phosphate, triphenyl phosphate and tricresyl phosphate; the glycollate esters, such as ethyl phthalyl ethyl glycollate; the glycol hexoate and octoate esters, such as triglycol di-2-ethylbutyrate and triglycol di-2-ethylhexoate; and the sebacate esters, such as dibutyl sebacate. Temperatures up to around 175° C. may conveniently be employed in connection with the application of pressure to produce the reinforced laminated sheet stock.

In the practice of the invention there may be substituted for the sheet, film, filament or fabric of plasticized or unplasticized vinyl halide-vinyl ester copolymer resin, a composite fabric woven or otherwise made from yarns or fibers of the aforesaid vinyl halide-acrylonitrile resin, plied or otherwise composited with yarns or fibers of a polyvinyl chloride or of a resin produced by the copolymerization of a vinyl halide with a vinyl ester of an aliphatic acid. Such composite fabric is treated with a solution or an emulsion of a plasticizer for the last-named vinyl resin by dipping, spraying or the like, and is then subjected to a suitable heat and pressure treatment. Similarly, the filaments, fibers, yarns, webs or fabrics used as the reinforcing elements in the composite structures of the invention may be made from yarns formed by twisting or otherwise compositing vinyl halide-acrylonitrile copolymer resin fibers with other textile fibers, such as cotton, silk, wool, glass, asbestos, etc.

Figure 2:
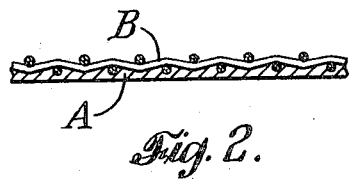
Figure 3:
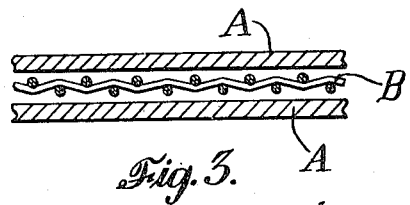
Figure 4:
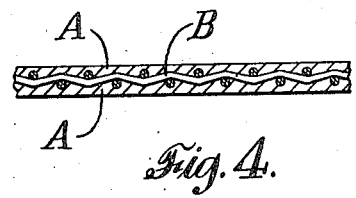
Figure 5:
Figure 6:
Figure 7:
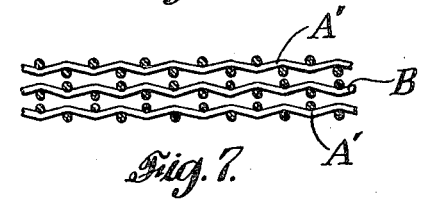
Figure 8:
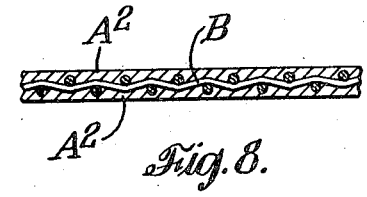
Figure 9:
Figure 10:

In the accompanying drawing, which illustrates certain modifications of the invention, Figs. 1 and 2, respectively, are enlarged diagrammatic sections of the components of one form of the invention, before and after the application of heat and pressure for completing the composite structure;

Figs. 3 and 4, respectively, are enlarged sections of the components of a second form of the invention, before and after application of heat and pressure;

Figs. 5 and 6, respectively, are enlarged sections of the components of a third form of the invention, before and after the application of heat and pressure;

Figs. 7 and 8, respectively, are enlarged sections of the components of still another form of the invention, before and after the application of heat and pressure; and Figs. 9 and 10, respectively, are enlarged views of two other forms of the composite structures of the invention.

Referring to Figs. 1 to 4, A designates a continuous sheet, film, or web of a water-insoluble thermoplastic vinyl resin containing a plasticizer for such resin; and B designates a preformed reinforcing fabric made of yarns, threads or filaments of an unplasticized vinyl resin having a higher softening point than the vinyl resin of element A, and with which the plasticizer for the vinyl resin of A is substantially incompatible at temperatures up to 200° C.

Figs. 2 and 4 illustrate the composite reinforced films or sheets formed from elements A and B after the application of pressure while heated to temperatures at which the plasticized resin of element A is softened but below the softening point of the resin of element B.

In Figs. 5 and 7, A' designates fabrics made from yarns, threads or filaments of a water-insoluble thermoplastic vinyl resin containing a plasticizer for such resin; and B designates a preformed reinforcing fabric similar to element B of Figs. 1 to 4.

In Figs. 6 and 8, A² designates a layer of the resin of element A which has been intimately bonded with the fabric of element B by the application of heat and pressure to the assemblies of Figs. 5 and 7, respectively. In Fig. 8 the textile element B is completely embedded within the layers of the resin formed from elements A², A².

Figs. 9 and 10, respectively, illustrate composite batts or webs formed from fibers, filaments or yarns C made of a vinyl resin readily plasticized by suitable plasticizers, intermixed with fibers, filaments or yarns D of a second vinyl resin having a higher softening point than fibers C and being formed from a resin produced by the conjoint polymerization of vinyl chloride and acrylonitrile. The fibers C are formed from a resin made by the conjoint polymerization of a vinyl halide and a vinyl ester of an aliphatic acid. A plasticizer for the resin of fibers C is present in the batt. Fig. 10 represents the batt of Fig. 9 after exposure thereof to heat and pressure to soften and render adhesive the resin of fibers C, and to compress and reshape the batt.

Figure 11:
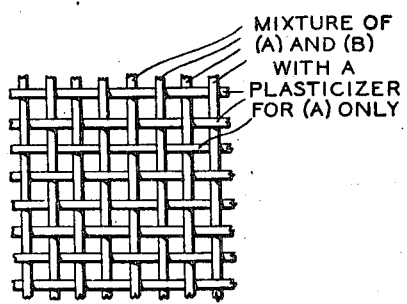

Fig. 11 represents a fabric made by weaving yarns respectively produced by plying filaments or fibers of a vinyl resin made by the conjoint polymerization of a vinyl halide and a vinyl ester of an aliphatic acid with filaments or fibers of a second vinyl resin made by the conjoint polymerization of a vinyl halide and acrylonitrile, applying to the fabric a plasticizer for the first-named resin, and subjecting the fabric to heat and pressure insufficient to soften or fuse the fibers of said second resin, but sufficient to plasticize and soften the fibers of the first-named resin and intimately bond such fibers to the fibers of said second resin.

Figure 12:
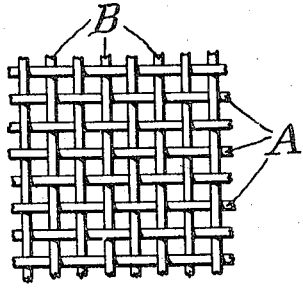

Fig. 12 represents a fabric made in manner similar to that of Fig. 11, but wherein the warp yarns are made from filaments or fibers of a vinyl chloride-acrylonitrile copolymer resin, and the filling yarns are made from filaments or fibers of a plasticized vinyl chloride-vinyl acetate copolymer resin.

The following examples serve to illustrate certain modifications of the invention:

*Example I*

One end of 750/150 unstretched vinyl resin yarn was plied—with five turns twist—with two ends of a 100/90 vinyl resin yarn which had been stretched 748% at 135° C. and stabilized to prevent shrinkage in water at 100° C.

The first-named resin was produced by the conjoint polymerization of vinyl chloride and vinyl acetate, and had 90.5% vinyl chloride in the polymer, and an average macromolecular weight of over 20,000. The second-named vinyl resin was produced by the conjoint polymerization of vinyl chloride and acrylonitrile; and had a vinyl chloride content of 66.9% and a specific viscosity at 20° C. of 0.222.

A fabric having 45 ends per inch in the warp and 34 ends per inch in the filling was woven from the plied composite yarn. After immersion of the fabric for fifteen minutes at 25° C., in a bath of dibutyl sebacate, and centrifuging the treated fabric until the latter had thereon approximately 30% of the plasticizer, based on the weight of the fabric, such fabric was placed between members heated to a temperature of about 150° C. and was subjected to a pressure of about 2,000 pounds per square inch for a period of ten minutes. Under these conditions, the plasticized copolymer vinyl chloride-vinyl acetate resin fused to form a thin, very flexible transparent sheet having embedded therein, in unchanged form.

the portion of the fabric formed from the vinyl chloride-acrylonitrile resin yarn. The resultant reinforced vinyl resin sheet was very flexible, and was appreciably stronger than and did not have the elastic extensibility of similarly plasticized but unreinforced sheets of the same vinyl chloride-vinyl acetate copolymer resin. The physical properties of the reinforced sheet thus produced may be modified by varying the amount of plasticizer, or by varying the plasticizer used.

Following this general procedure, unstretched yarn made from copolymers of vinyl chloride and vinyl acetate may be plied with high strength stretched yarns made from copolymers of vinyl chloride-acrylonitrile, in a ratio range of from around 20:1 to around 5:1 by weight; and the resultant fabric plasticized by treatment with a plasticizer such as di (ethylhexyl) phthalate in the form of an emulsion. After removal of the excess plasticizer, the composite fabric may be converted to a reinforced sheet stock by a heat and pressure treatment in the manner indicated above. The yarn formed from the vinyl chloride-vinyl acetate copolymer alone absorbs substantial amounts of the plasticizer, and it alone is fused in the subsequent application of pressure at temperatures ranging around 140° C. to 175° C.

In certain instances it is advantageous to prepare the reinforced vinyl resin sheet from staple fibers of the two types of vinyl resins, one of which is resistant to or is not substantially modified or softened by the plasticizer or softening agent for the other resin at the temperature and pressure used for making the composite article. Preferably, crossed carded batts of mixtures of staple fibers made from the two types of resins are prepared and treated with a plasticizer for the resin having the lower softening point, for example, the vinyl chloride-vinyl acetate copolymer resin. The resultant batt is then fused and reshaped by the use of heat and pressure to form a vinyl resin sheet having distributed therein the reinforcing staple fibers of the other vinyl resin.

*Example II*

A carded crossed batt was prepared, consisting of one part by weight of 1 filament denier staple fibers formed from a vinyl chloride-acrylonitrile resin, and 5.7 parts by weight of 2.5 filament denier staple fibers formed from a vinyl chloride-vinyl acetate copolymer resin. The first-named resin contained about 60% of vinyl chloride in the polymer and had a specific viscosity at 20° C. of about 0.3. The fibers of such resin had been stretched 800% at 130° C., and were 1.5 inches in length. The vinyl chloride-vinyl acetate staple fibers were made from a vinyl resin having a vinyl chloride content of 90.5% and an average macromolecuar weight of about 14,000, such fibers being about 1.5 inches in length. The batt, supported, was immersed in a bath of triglycol di-2-ethylbutyrate and was then pressed to remove excess of the plasticizer. The batt was then compressed under a pressure of 2,000 pounds per square inch while heated to a temperature of about 150° C. This yielded a flexible plasticized sheet stock containing therein in random arrangement, reinforcing staple fibers of the vinyl chloride-acrylonitrile copolymer resin of high strength, which had not absorbed substantial amounts of the plasticizer and which were not fused during the heat and pressure treatment.

The following example illustrates the production of a strong, tough, stretch-resistant composite article comprising one or more sheets or films of a plasticized vinyl resin produced by the conjoint polymerization of vinyl chloride and a vinyl ester of an aliphatic acid, and containing around 30% of di (ethylhexyl) phthalate as a plasticizer, reinforced by an interposed woven or other fabric formed from filaments or yarns made of a vinyl chloride-acrylonitrile copolymer resin. Such a laminated article may be made by placing a woven or other fabric of the last-named resin yarn between two sheets of a plasticized copolymer vinyl chloride-vinyl acetate resin containing around 95% of the chloride in the polymer and having an average macromolecular weight of around 21,000, and bonding these associated parts by the application of heat and pressure. To facilitate the penetration of the interstices in the fabric by the vinyl resin of the sheeting, the fabric may first be wetted with a plasticizer for the vinyl resin of the sheeting.

*Example III*

A fabric was woven with 96 picks per inch from vinyl resin yarns made by twisting 30 filaments totaling 45 denier made of a vinyl chloride-acrylonitrile copolymer resin containing 58.3% vinyl chloride in the polymer and having a specific viscosity at 20° C. of 0.307. Such fabric was placed between two sheets of a plasticized vinyl resin sheet stock, each about 0.008 inch in thickness and made from a vinyl resin formed by the conjoint polymerization of vinyl chloride and vinyl acetate and having a vinyl chloride content of around 95% and an average macromolecular weight of around 21,000, such resin containing about 30% of dioctyl phthalate therein as plasticizer. A pressure of 2,000 pounds per square inch was applied to this composite body for 10 minutes in a plate press while it was heated to a temperature of 170° C., after which the pressure was released. The resultant composite article, when cooled to room temperature, possessed high flexibility and excellent dimensional stability, while having increased tensile strength and being impervious to air and non-solvent liquids. The fabric was embedded within and intimately bonded to the sheet stock, but was substantially unaffected by the plasticizer present in the latter.

It is advantageous in some instances to dampen the vinyl resin fabric with the plasticizer present in the sheet stock, or with an equivalent plasticizer, before compositing the fabric sheet stock and forming the laminated article by heat and pressure.

An attractive reinforced laminated structure having excellent strength and resistance to stretching, puncturing and tearing forces may be produced by a continuous calendering operation or its equivalent, as is evidenced by the following example.

*Example IV*

A fabric of flat woven construction having 96 picks per inch in both warp and filling, formed from stretched 45/30 yarns made of a vinyl resin produced by the conjoint polymerization of vinyl chloride and acrylonitrile and containing 58.3% of the chloride in the polymer and having a specific viscosity at 20° C. of 0.303, had superposed thereon a film 0.006 inch in thickness of a vinyl resin produced by the conjoint polymerization of vinyl chloride and vinyl acetate, and having around 89.5% of vinyl chloride in the polymer, and an average macromolecular weight of 16,000, said film having therein around 36% of diethylhexyl phthalate, based on the weight of the resin. The assembly of fabric and film was then pressure used in making the composite sheet material.

5. A flexible multi-ply thermoplastic sheet material in the form of a composite fibrous structure highly resistant to deformation by puncturing, tearing and stretching forces, which comprises at least one ply formed from a vinyl resin selected from the class consisting of the polyvinyl resins produced by the conjoint polymerization of a vinyl halide with a vinyl ester of an aliphatic acid, polyvinyl chloride resins, and after-chlorinated polyvinyl resins of the foregoing types, said resin containing a plasticizer therefor, and intimately united therewith by heat and pressure at least one reinforcing ply containing fibers of a vinyl resin having a higher softening point than the first-named vinyl resin and which is not substantially plasticized by said plasticizer nor fused under the temperature and pressure employed in forming the multi-ply sheet material, the resin of higher softening point from which said fibers were formed being a copolymer of vinyl chloride and acrylonitrile substantially all portions of which resin contain between about 45% and about 80% of the chloride in the polymer, have a specific viscosity at 20° C. within the range from 0.2 to 0.6, and are dispersible in acetone.

6. A composite structure of thermoplastic sheet material comprising a fabric containing reinforcing fibers of a vinyl resin, said fabric being intimately and permanently united throughout at least one surface thereof by heat and pressure with a continuous body of a second vinyl resin containing a plasticizer for the latter, the first-named vinyl resin from which said reinforcing fibers were made being dispersible in acetone and having a substantially higher softening point than said second resin, and being incompatible with said plasticizer up to a temperature substantially above the softening point of said second vinyl resin, such first-named resin being a conjoint polymer of vinyl chloride and acrylonitrile substantially all portions of which contain from 45% to 80% of the chloride in the polymer and have a specific viscosity at 20° C. between 0.2 and 0.6, and said second vinyl resin being selected from the class consisting of the polyvinyl resins produced by the conjoint polymerization of a vinyl halide with a vinyl ester of an aliphatic acid, polyvinyl chloride resins, and after-chlorinated polyvinyl resins of the foregoing types.

7. Process for the production of reinforced flexible thermoplastic composite structures resistant to puncturing, tearing and stretching forces, which comprises intimately contacting at least one sheet-like element and a structure of filamentary reinforcing elements, said sheet-like element being formed from a vinyl resin selected from the class consisting of the polyvinyl resins produced by the conjoint polymerization of a vinyl halide with a vinyl ester of an aliphatic acid, polyvinyl chloride resins, and after-chlorinated polyvinyl resins of the foregoing types, said vinyl resin containing a plasticizer therefor, and said structure of filamentary reinforcing elements containing fibers which were made from a resinous acetone-dispersible copolymer of vinyl chloride and acrylonitrile substantially all portions of which contain from 45% to 80% of the chloride in the polymer and have a specific viscosity at 20° C. of from 0.2 to 0.6, such copolymer having a softening point substantially higher than that of said first-named vinyl resin, and applying to the resultant assembly heat and pressure sufficient to soften at least portions of the plasticized resin sheet-like element but insufficient substantially to fuse the vinyl chloride-acrylonitrile copolymer filamentary reinforcing elements, thereby producing a permanent composite structure of excellent strength and resistant to puncturing, tearing and stretching forces, said vinyl chloride-acrylonitrile copolymer being substantially unplasticized by said plasticizer under the heat and pressure conditions employed in making the reinforced structure.

8. Process for the production of reinforced flexible thermoplastic composite structures resistant to puncturing, tearing and stretching forces, which comprises contacting at least one sheet-like element with a reinforcing fabric, said sheet-like element being formed from a vinyl resin selected from the class consisting of the polyvinyl resins produced by the conjoint polymerization of a vinyl halide with a vinyl ester of an aliphatic acid, polyvinyl chloride resins, and after-chlorinated polyvinyl resins of the foregoing types, said vinyl resin containing a plasticizer therefor, and said reinforcing fabric containing fibers made of a copolymer of vinyl chloride and acrylonitrile having a softening point substantially higher than that of said first-named vinyl resin, substantially all portions of said copolymer from which said fibers were made being dispersible in acetone, containing between around 45% and around 80% of the chloride in the polymer, and having a specific viscosity at 20° C. within the range between 0.2 and 0.6 and applying to the resultant assembly heat and pressure sufficient to soften the plasticized resin of the sheet-like element but insufficient substantially to fuse the vinyl chloride-acrylonitrile copolymer, thereby producing a permanent reinforced composite structure of excellent strength and resistant to puncturing, tearing and stretching forces, said vinyl chloride-acrylonitrile copolymer being substantially unplasticized by said plasticizer under the heat and pressure conditions employed in making the reinforced structure.

EDWARD W. RUGELEY.
THEOPHILUS A. FEILD, JR.

REFERENCES CITED

The following references are of record in the file of this patent:

UNITED STATES PATENTS

| Number | Name | Date |
|---|---|---|
| 2,224,994 | Thinius | Dec. 17, 1940 |
| 2,261,313 | Thinius et al. | Nov. 4, 1941 |
| 2,253,000 | Francis, Jr. | Aug. 19, 1941 |
| 2,278,895 | Rugeley et al. | Apr. 7, 1942 |
| 2,185,356 | Robertson | Jan. 12, 1940 |
| 1,966,856 | Groff | July 17, 1934 | passed through calender rolls heated to 105° C., whereby a composite article of excellent flexibility, strength, and imperviousness to water and chemical agents was produced which was reinforced by the vinyl chloride-acrylyonitrile resin fabric. The lateral shrinkage of the fabric resulting from the calendering operation was only 4%.

Calender temperatures of 150° C. and above may be employed when using a reinforcing fabric made from unstretched vinyl chloride-acrylonitrile threads, or when using stretched threads which have been subjected to temperatures near 150° C. while untensioned for strain release, following the stretching operation.

By the practice of the present invention, it is now possible to produce, entirely from vinyl resin stocks, useful articles including comparatively thin sheets, films, fabrics and the like of highly flexible, resilient construction which, while highly resistant to the action of water, acids, alkalies, bacterial and fungal growths, are highly resistant to tearing and puncturing forces and to permanent distortion under impacts.

It is within the scope of the invention to use as a reinforcing element or elements fibers, or woven, knitted, felted or other fabrics made from mixtures of the vinyl chloride-acrylonitrile copolymer resins with natural fibers and other artificial thermoplastic fibers not susceptible to fusion at the temperature employed for the heat and pressure treatment. Among fibers suitable for use in this manner may be mentioned those of silk, wool, cotton, and of the various polyamides of the nylon type. Likewise, the reinforcing fabric of the vinyl chloride-acrylonitrile copolymer resin may be of an open nature wherein adjacent parallel strands, strips or threads thereof may be spaced at some distance from each other. There also may be substituted for or associated with the sheets, fibers, etc., of the vinyl chloride-vinyl acetate copolymer resin, other vinyl resins, and particularly those containing a vinyl halide in the polymer and capable of being plasticized by the usual vinyl resin plasticizers. Examples of such resins are polyvinyl chlorides and after-chlorinated polyvinyl chlorides.

The term "sheet-like element" is used in the claims to designate sheets, webs, batts, and woven, knitted, braided, felted and other similar fabrics which are thin in one cross-section.

The invention is susceptible of modification within the scope of appended claims.

We claim:

1. A composite structure of thermoplastic material, which structure is resistant to deformation by puncturing, tearing and stretching forces, which comprises at least one flexible, sheet-like element formed from a vinyl resin selected from the class consisting of polyvinyl resins produced by the conjoint polymerization of a vinyl halide with a vinyl ester of an aliphatic acid, polyvinyl chloride resins, and after-chlorinated polyvinyl resins of the foregoing types, said vinyl resin containing a plasticizer for such resin, and permanently united therewith by heat and pressure a structure of filamentary reinforcing elements formed from a vinyl chloride-acrylonitrile copolymer resin which is not substantially plasticized by said plasticizer nor fused at the temperature and pressure employed in making the composite structure, the resin from which said filamentary reinforcing elements were made being dispersible in acetone, and substantially all portions of the last-named resin having a higher softening point than the first-named vinyl resin and containing between about 45% and about 80% of the chloride in the polymer and having a specific viscosity at 20° C. within the range between 0.2 and 0.6.

2. A composite structure of thermoplastic material, which structure is resistant to deformation by puncturing, tearing and stretching forces, which comprises at least one flexible sheet-like element formed from a vinyl resin produced by the conjoint polymerization of vinyl chloride and vinyl acetate and having between about 70% and about 95% of the chloride in the polymer, said vinyl resin containing a plasticizer for such resin, and permanently united therewith by heat and pressure a structure of filamentary reinforcing elements formed from an unplasticized vinyl chloride-acrylonitrile copolymer resin resistant to penetration by said plasticizer, the resin from which said filamentary reinforcing elements were made being dispersible in acetone, and substantially all portions of the last-named resin having a higher softening point than the first-named vinyl resin and containing between around 45% and around 80% of the chloride in the polymer, and having a specific viscosity at 20° C. between 0.2 and 0.6.

3. A composite structure of thermoplastic material, which structure is resistant to deformation by puncturing, tearing and stretching forces, which comprises at least one sheet-like element made of a vinyl resin selected from the class consisting of the polyvinyl resins produced by the conjoint polymerization of a vinyl halide with a vinyl ester of an aliphatic acid, polyvinyl chloride resins, and after-chlorinated polyvinyl chloride resins of the foregoing types, said vinyl resin containing a plasticizer for such resin, and intimately and permanently united with such sheet-like element at least one reinforcing structure containing fibers made from a vinyl resin having a higher softening point than the first-named vinyl resin and which is not substantially plasticized by the said plasticizer nor fused under the conditions of temperature and pressure used in making the composite structure, said resin of higher softening point from which said fibers were made being dispersible in acetone, and being a copolymer of vinyl chloride and acrylonitrile substantially all portions of which contain between about 45% and about 80% of the chloride in the polymer and have a specific viscosity at 20° C. between 0.2 and 0.6.

4. A flexible composite sheet of thermoplastic material comprising at least one sheet-like element of a vinyl resin selected from the class consisting of the polyvinyl resins produced by the conjoint polymerization of a vinyl halide with a vinyl ester of an aliphatic acid, polyvinyl chloride resins, and after-chlorinated polyvinyl chloride resins of the foregoing types, said resin containing a plasticizer therefor, and intimately and permanently bonded with such sheet-like element by heat and pressure a reinforcing fabric containing fibers of a vinyl resin formed by the copolymerization of vinyl chloride and acrylonitrile, substantially all portions of the resin from which said fibers were formed containing from 45% to 80% of the chloride in the polymer, being dispersible in acetone, and having a specific viscosity at 20° C. of from 0.2 to 0.6, which last-named resin has a substantially higher softening point than the first-named vinyl resin and is not substantially plasticized by said plasticizer nor fused under the conditions of heat and